US010452313B2

(12) United States Patent
Jung

(10) Patent No.: US 10,452,313 B2
(45) Date of Patent: *Oct. 22, 2019

(54) APPARATUSES AND METHODS FOR MULTIPLE ADDRESS REGISTERS FOR A SOLID STATE DEVICE

(71) Applicant: Micron Technology, Inc., Boise, ID (US)

(72) Inventor: Juyoung Jung, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,631

(22) Filed: Oct. 30, 2018

(65) Prior Publication Data
US 2019/0065104 A1    Feb. 28, 2019

Related U.S. Application Data

(63) Continuation of application No. 15/047,000, filed on Feb. 18, 2016, now Pat. No. 10,140,057.

(51) Int. Cl.
*G06F 12/00* (2006.01)
*G06F 3/06* (2006.01)
(Continued)

(52) U.S. Cl.
CPC ............ G06F 3/0658 (2013.01); G06F 3/061 (2013.01); G06F 3/0604 (2013.01); G06F 3/0647 (2013.01); G06F 3/0656 (2013.01); G06F 3/0661 (2013.01); G06F 3/0679 (2013.01); G06F 3/0685 (2013.01);
(Continued)

(58) Field of Classification Search
CPC .... G06F 3/0658; G06F 3/0656; G06F 3/0679; G06F 12/0802; G06F 3/0685; G06F 3/0647; G06F 3/0604
See application file for complete search history.

(56) References Cited

U.S. PATENT DOCUMENTS 5,535,349 A * 7/1996 Boaz .................. G06F 12/0661
711/1
6,170,047 B1 * 1/2001 Dye ........................ G06F 12/08
345/531
(Continued)

FOREIGN PATENT DOCUMENTS

EP    2763047 A2    8/2014

OTHER PUBLICATIONS

International Search Report and Written Opinion from related international applicaton No. PCT/US2017/017170, dated Jun. 9, 2017, 16 pp.
(Continued)

*Primary Examiner* — David Yi
*Assistant Examiner* — Alan Otto
(74) *Attorney, Agent, or Firm* — Brooks, Cameron & Huebsch, PLLC

(57) ABSTRACT

The present disclosure includes apparatuses, systems, and methods related to multiple address registers for a solid state device (SSD). An example apparatus includes a controller including a plurality of base address registers (BARs) each including same addresses for data storage in a same memory resource and an SSD that includes the same memory resource.

20 Claims, 3 Drawing Sheets

(51) Int. Cl.
*G06F 12/0802* (2016.01)
*G06F 12/0866* (2016.01)
*G06F 12/0888* (2016.01)

(52) U.S. Cl.
CPC ........ *G06F 3/0688* (2013.01); *G06F 12/0802* (2013.01); *G06F 12/0866* (2013.01); *G06F 12/0888* (2013.01); *G06F 2212/1024* (2013.01); *G06F 2212/1048* (2013.01); *G06F 2212/214* (2013.01)

(56) References Cited

U.S. PATENT DOCUMENTS

| | | |
|---|---|---|
| 9,256,384 B2 | 2/2016 | Bert et al. |
| 2007/0019637 A1 | 1/2007 | Boyd et al. |
| 2008/0288661 A1 | 11/2008 | Galles |
| 2014/0006659 A1 | 1/2014 | Foong et al. |
| 2014/0372657 A1 | 12/2014 | Jones et al. |
| 2015/0317084 A1 | 11/2015 | Hwang et al. |

OTHER PUBLICATIONS

Office Action from related Taiwanese patent application No. 106105443, dated Jan. 15, 2018, 12 pp.

\* cited by examiner

APPARATUSES AND METHODS FOR MULTIPLE ADDRESS REGISTERS FOR A SOLID STATE DEVICE

PRIORITY INFORMATION

This application is a Continuation of U.S. application Ser. No. 15/047,000 filed Feb. 18, 2016, the contents of which are included herein by reference.

TECHNICAL FIELD

The present disclosure relates generally to solid state devices, and more particularly, to apparatuses and methods for multiple address registers for a solid state device.

BACKGROUND

A component interface circuit may communicate via a logical connection, referred to as an interconnect or a link, which may provide a point-to-point communication channel between two ports, thereby allowing both ports to send and/or receive requests (such as configuration read/write, I/O read/write, memory read/write, among other requests). For instance, in a system that uses a peripheral component interconnect express (PCIe) bus, in order for a PCIe peripheral memory device to be addressable, the peripheral memory device may first be mapped into an I/O port address space or a memory-mapped address space of the system. The system's firmware, device drivers, and/or operating system may program the mapping of the peripheral memory device to a base address register to inform the peripheral memory device of its address mapping by writing configuration commands to a PCIe controller.

DETAILED DESCRIPTION

Figure 1:
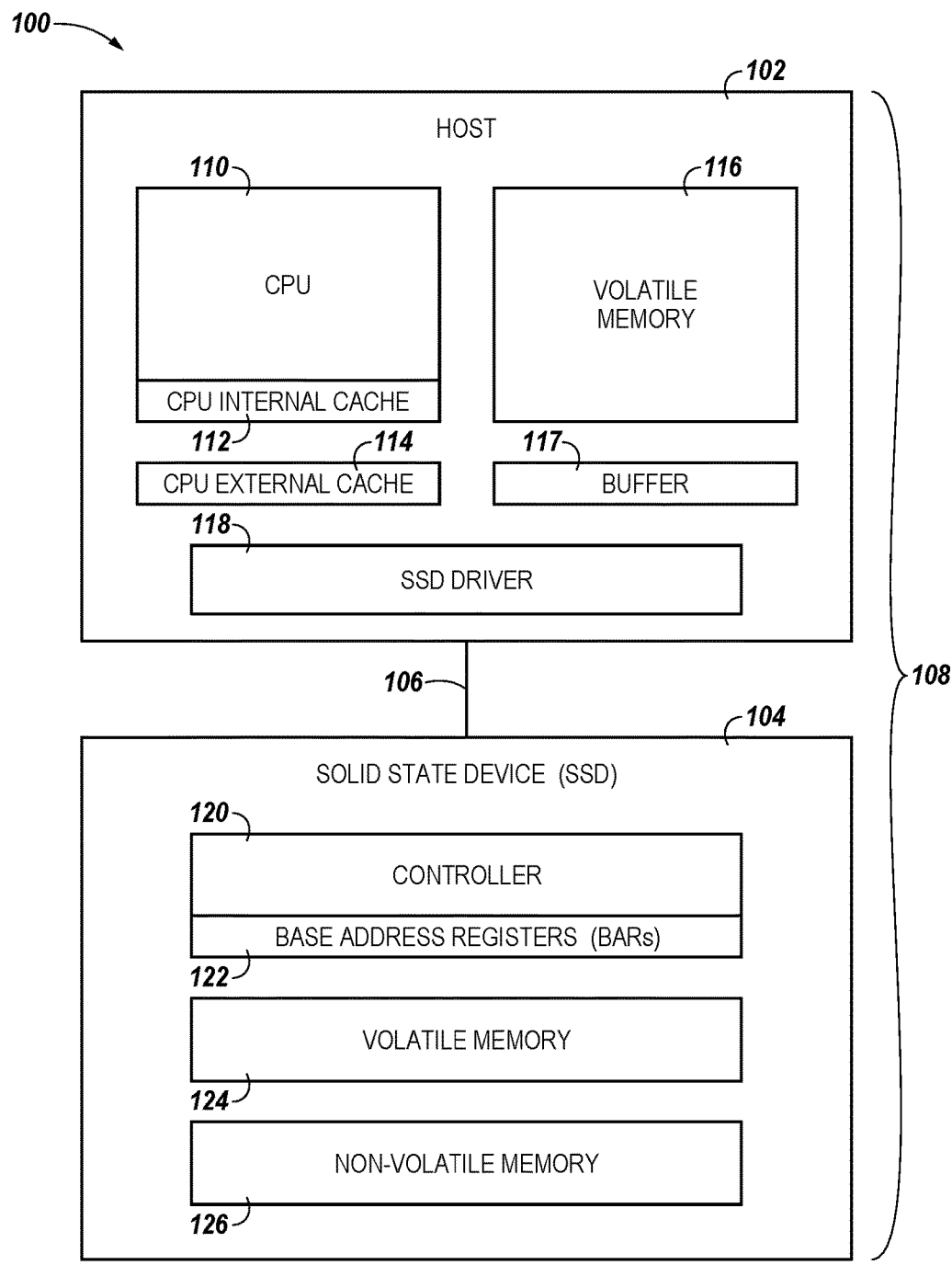
FIG. 1 is a block diagram of a system for multiple address registers for a solid state device in accordance with a number of embodiments of the present disclosure.

The present disclosure includes apparatuses and methods related to multiple address registers for a solid state device (SSD). An example apparatus includes a controller including a plurality of base address registers (BARs) each including same addresses for data storage in a same memory resource and an SSD that includes the same memory resource.

A distributed computing architecture may include the use of an interface circuit that interconnects the distributed components of the distributed system. For example, a PCIe can be a serial computer expansion circuit (bus) that may provide improvements over, for example, PCI, PCI-X, and AGP (Accelerated Graphics Port) bus standards, among others. Such improvements may include higher system bus throughput, lower I/O pin count and a smaller physical footprint, better performance-scaling for bus devices, more detailed error detection and reporting mechanisms, and/or native hot-plug functionality. Embodiments described herein make reference to PCIe for simplicity. However, as one of ordinary skill in the art would appreciate, other interfaces and/or interconnection systems, such as PCI, among others, are contemplated.

The PCIe bus, for example, may be a high-speed serial interconnect bus using shared address/data lines. Accordingly, the PCIe bus may differ from other PCI buses in its bus topology. For instance, a PCI may use a shared parallel bus architecture, where the PCI host and all devices share a common set of address/data/control lines. Because of this shared bus topology, access to a PCI bus may be arbitrated in the case of multiple masters and may be limited to one master at a time in a single direction. In contrast, a PCIe bus may be based on a point-to-point topology with separate serial links connecting every device to a root complex (or host).

As described herein, a cache attribute refers to one of a number of caching options for storing a copy of data temporarily in a storage medium (one or more caches) for performance of operations by a processor. In some embodiments, the processor may be a central processing unit (CPU), as described herein. The one or more caches may be more readily accessible by and/or local to the processor than bulk storage of the data, for example, in non-volatile memory of an SSD. Examples of the cache attributes include write combining (WC), write protected (WP), write back (WB), write through (WT), write around (WA), strong uncacheable (UC), and/or uncacheable (UC−), among other options known in the art.

In some implementations of secondary memory (e.g., of a PCIe peripheral memory device) there may be one-to-one mapping of a single BAR to an entire physical memory resource region, which may be located in non-volatile memory of an SSD, and the entire mapped region may be assigned the same cache attribute. Hence, such an approach to SSD mapping does not differentiate the request type (e.g., differentiate a read request from a write request, among other types of requests) for address mapping and, possibly, does not include different properties for caching (cache attributes) because the SSD has only one mapping capability in one BAR. This approach may constrain, for example, the read or write latency to being biased for one type of request, among various types of requests, for access to the physical memory resource region. The physical memory resource region may be accessed using, for example, mmap, which is a memory-mapped file I/O call that can map files or devices into memory.

In addition, processing speed of data accessed from (e.g., in a read operation) and/or sent for storage in (e.g., in a write operation) the SSD may be reduced by such data being uncacheable (UC and/or UC−) such that the data is not stored in a cache readily accessible by and/or local to the processor. For example, controller 120 associated with SSD 104 of the interface (e.g., PCIe) circuit 108 shown and described in connection with FIG. 1, among other locations herein, may not support a cache coherence protocol. In some instances, memory mapped I/O registers or memory regions may be marked as uncacheable by a system default setting of the interface circuit and/or the interface circuit may not be configured for caching data.

Among other possibilities, the CPU processor's cache controllers and/or a dynamic random access memory (DRAM) controller may be configured to support the cache coherence protocol in combination with the processor of the CPU. However, an SSD controller (e.g., for PCIe) not configured to support the coherence protocol may result in a memory region of the SSD being marked as uncacheable. When the SSD controller is incapable of conforming to a CPU processor's cache coherence protocol, data in the SSD memory address region may be prevented from being cached directly into the processor's cache memory. This may limit SSD performance because accessing a region in the SSD may first be copied to DRAM memory and then copied from the DRAM memory to the processor's cache memory by way of a cacheable DRAM memory region, rather than being copied, for example, to both the DRAM memory and the processor's cache memory at the same time. Such an interface circuit may not be configured to enable direct caching of data for use by the processor during performance of an operation, such as a read operation type or a write operation type.

The present disclosure addresses these potential limitations to performance of an interface circuit 108 (e.g., a PCIe circuit) through use of, for example, a read BAR (RD-BAR) and a separate write BAR (WR-BAR) for the same (identical) physical memory resource. For example, mapping of the physical memory resource may be set at the same time to cacheable (e.g., WP, among other possible cache attributes) for a read request assigned to the RD-BAR and mapping may be set to a cache attribute (e.g., WC, among other possible cache attributes) for a write request assigned to the WR-BAR. In various embodiments, the cache attribute assigned to the RD-BAR may be different from the cache attribute assigned to the WR-BAR.

In contrast to implementations in which the data is uncacheable and/or in which a single cache attribute is biased for one type of request, the present disclosure describes that the same physical memory resource may be utilized as being, for example, WP cacheable or as being WC uncacheable depending on the request type. The cache attributes being selectable dependent upon the request type can be enabled by selectably coupling the same physical memory resource with multiple (two in this example) BARs each assigned a particular cache attribute for the particular request type. As such, the caches being readily accessible by and/or local to the processor and/or each cache being associated with a cache attribute selected for performance of a particular operation may, for example, reduce latency in performance of such an operation relative, for example, to retrieving data from the secondary memory (e.g., NAND flash memory) for processing, among other benefits.

As described herein, a read request type can be a command for performance of a read operation type, which can include retrieval of data from the physical memory resource (e.g., for processing) and a write request type can be a command for performance of a write operation type, which can include accumulation and/or transfer of data to be sent to the physical memory resource (e.g., for storage). The read request may be cacheable in association with the WP cache attribute (e.g., using a Level 1 (L1), Level 2 (L2), Level 3 (L3), and/or Level 4 (L4) cache, among other types of caches, associated with the processor). The write request may be uncacheable in association with the WC cache attribute (e.g., using a buffer associated with the processor) and sent to a particular secondary memory SSD (e.g., a peripheral memory device in a PCIe circuit) for a write operation directed by its controller, as described in connection with FIG. 3, rather than, for example, through a more indirect WC buffer to DRAM to secondary memory SSD operation. The write request may be performed with the WC cache attribute to uncacheable SSD memory because this may, for example, reduce a number of memory requests that a DRAM memory controller receives and/or make the data write operation more favorable to the write granularity of the SSD, among other reasons.

By differentiating request types, two (or more) separate cache attributes can be assigned to the same physical memory resource simultaneously. Implementation of the multiple BARs, as described herein, may increase the speed of direct access to the physical memory resource and/or processing speed of data retrieved from and/or sent for storage in the physical memory resource.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, "a number of" a particular thing can refer to one or more of such things (e.g., a number of memory arrays can refer to one or more memory arrays). A "plurality of" is intended to refer to more than one of such things. Furthermore, the words "can" and "may" are used throughout this application in a permissive sense (i.e., having the potential to, being able to), not in a mandatory sense (i.e., must). The term "include", and derivations thereof, means "including, but not limited to". The terms "coupled" and "coupling" mean to be directly or indirectly connected physically or for access to and movement (transmission) of commands and/or data, as appropriate to the context.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure and should not be taken in a limiting sense.

FIG. 1 is a block diagram of a system for multiple address registers for an SSD in accordance with a number of embodiments of the present disclosure. As illustrated in FIG. 1, the system 100 may include a host computing device 102. The host computing device 102 can, in various embodiments, include a number of components, as described herein. The system 100 also may include at least one SSD 104 connected to the host computing device 102 by a bus 106. The SSD 104 can, in various embodiments, include a number of components, as described herein. In some embodiments, the host computing device 102 and the bus 106 may be operated as an interface circuit 108 (e.g., a PCIe circuit) with the at least one SSD 104 representing one of a number of memory devices that include secondary memory, as described herein. As used herein, a host computing device 102, CPU 110, a number of caches 112 internal to the CPU 110, a number of caches 114 external to the CPU 110, non-volatile memory 116, buffer 117, SSD driver 118, at least one SSD 104, bus 106, controller 120, a plurality of BARs 122, volatile memory 124, and/or non-volatile memory 126 might be separately or collectively considered an "apparatus."

For clarity, description of the system 100 has been simplified to focus on features with particular relevance to the present disclosure. For example, in various embodiments, there may be more than one host computing device 102 and/or more than one SSD 104 operating as secondary memory, for example, in peripheral memory devices of a PCIe circuit. The physical memory resource of the SSD 104 can be a 3D XPoint array, a DRAM array, a SRAM array, a STT RAM array, a PCRAM array, a TRAM array, a RRAM array, a NAND flash array, and/or a NOR flash array, for example, which may, in various embodiments, operate in combination as volatile memory 124 and/or non-volatile memory 126 of the physical memory resource. Such a physical memory resource can include memory cells arranged in rows coupled by access lines (which may be referred to as word lines or select lines) and columns coupled by sense lines (which may be referred to as data lines or digit lines). In some embodiments, the plurality of memory arrays of the physical memory resource can be partitioned, as described herein.

As described herein, a 3D XPoint array is intended to mean a three-dimensional cross-point array of memory cells for an SSD that is configured for non-volatile data storage and for reduced latency of data access and/or retrieval. The latency may be reduced relative to other non-volatile memory (e.g., NAND flash memory) to a level approaching the relatively short latency achievable with volatile memory (e.g., DRAM memory).

Although a single embodiment of a physical memory resource is illustrated herein (e.g., "SSD memory resources" as shown at and described in connection with 228 in FIGS. 2 and 328 in FIG. 3), which can be referred to herein as a "same" physical memory resource, embodiments are not so limited. For example, the SSD shown at 104 in FIG. 1 and described in connection with corresponding reference numbers in FIGS. 2 and 3 may include a plurality of memory arrays and/or types of memory arrays (e.g., one or more DRAM arrays, one or more NAND flash arrays, and/or one or more 3D XPoint arrays, etc.) in addition to a number of subarrays of each. Regardless of the number of memory arrays and/or types of memory arrays, the addresses for the data stored in the SSD memory resources of the single physical memory resource may be registered the same (identically) in the plurality of BARs selectably coupled to the same physical memory resource. In some examples, the non-volatile memory 126 (e.g., NAND flash arrays and/or 3D XPoint arrays, etc.) may be the secondary memory in the SSD memory resources for which the same addresses may be registered in the plurality of BARs. For example, in some embodiments, the addresses of the volatile memory 124 (e.g., DRAM) may not be registered in the BARs.

In at least one embodiment, the host computing device 102 may include a CPU 110 to command (request) and/or participate in performance of (via one or more processors) various operations, such as the read operation type and the write operation type described herein. In addition to an L1 cache, the present disclosure may, in various embodiments, utilize combinations of at least one of three other levels of cache, such as L2, L3, and/or L4. The L1, L2, L3, and/or L4 caches each may contribute to bridging a gap between a fast CPU 110 and a slower secondary memory (e.g., of a PCIe peripheral memory device). The host computing device 102 can, in some embodiments, include a number of internal caches 112 as part of the CPU 110. The L1, L2, and/or L3 caches may be built into the CPU (as the internal caches 112). In various embodiments, an L2 cache or an L3 cache may be a last level cache (LLC) in the internal cache 112 hierarchy.

Alternatively or in addition, the host computing device 102 can include a number of external caches 114 that are external to the CPU 110. The internal and/or external caches may be configured as memory to at least temporarily store data retrieved from the physical memory resource of the SSD 104 in order to be used by the CPU 110 in performance of a number of operations, such as the read operation type described herein. For example, a L1, L2, and/or L3 cache hierarchy in the internal caches 112 may store data that is frequently and/or recently accessed by the CPU 110. When data requested by the CPU 110 are not found in the respective internal cache hierarchy, the external caches 114 may be checked to determine if the requested data are cached therein. The external cache(s) 114 may, in various embodiments, include one or more of various types of caches. The external cache(s) 114 may contribute to a multi-level storage strategy for improving computer performance. Caches such as L4 may be located external to the CPU (as the external caches 114), for example, off-chip and/or built into a motherboard, among other locations.

If the requested data are not cached in the external caches 114, a memory access request may be sent to the SSD driver 118 and/or one or more of the controllers 120 in the SSDs to retrieve the data from, for example, non-volatile memory 126. In some embodiments, the host computing device 102 may include additional memory. The additional memory may, for example, be volatile memory 116, such as DRAM, among other types of volatile memory.

The host computing device 102 can, in some embodiments, include a number of buffers 117 as part of, or external to, the CPU 110. The buffer 117 may be memory configured to accumulate data, for example, as received from the CPU 110, and transfer the data to the physical memory resource of the SSD 104 in performance of a number of operations, such as the write operation type described herein.

As described herein, the host computing device 102 may include a primary memory resource, which may include the internal caches 112, the external cache(s) 114, the buffer 117, and/or the volatile memory 116. In contrast, the SSD 104 includes the same physical memory resource, which is considered to be a secondary memory resource that may include, for example, a combination of volatile memory 124 and/or non-volatile memory 126, as described herein.

In various embodiments, the system 100 can include an SSD driver 118. The SSD driver 118 can be configured to perform at least the functions described herein in connection with multiple BARs 122 disposed, for example, on the SSD 104. In some embodiments, the host computing device 102 can include the SSD driver 118, although embodiments are not so limited. For example, the SSD driver 118 for the SSD 104 may be disposed on the SSD 104 itself or elsewhere in in the system 100. In embodiments in which the SSD driver 118 is disposed on the host computing device 102, the SSD driver 118 can be selectably coupled to the CPU 110 and selectably coupled via bus 106 to the SSD 104. For example, at least one SSD driver 118 may be configured to selectably couple to a controller 120 in each SSD 104 (e.g., peripheral memory device of a PCIe circuit) to provide instructions related to usage of the multiple BARs 122, caches 112, 114, buffers 117, and/or cache attributes, as described herein. In some embodiments, the controller 120 may include the BARs 122 for the SSD 104 upon which the controller 120 is disposed. In addition, the controller 120 may be configured to control access to the same physical memory resource of each SSD 104, as described herein.

In at least one embodiment, the present disclosure can be implemented as follows. The SSD 104 may include two separate BARs 122 for addressing the same physical memory resource in the SSD. The two separate BARs 122 may, in some embodiments, be positioned on and/or in association with (disposed on) a controller 120 of the SSD. In various embodiments, the same physical memory resource may include non-volatile memory 126 (e.g., NAND flash memory and/or 3D XPoint memory, among other types of non-volatile memory) and, in some embodiments, volatile memory 124 (e.g., DRAM, among other types of volatile memory).

During system initialization, memory address regions for the same physical resource may be registered in the multiple BARs 122. For example, the same addresses for data storage in the same secondary memory resource may be registered in a first BAR and a second BAR in a controller 102 of an SSD 104 when the SSD is initialized. A cache attribute assigned to a RD-BAR (e.g., as shown at 222-1 and described in connection with FIG. 2) for a read request may be set to WP cacheable (e.g., in the internal caches 112 and/or external cache(s) 114 associated with the CPU 110). A cache attribute assigned to a WR-BAR (e.g., as shown at 322-2 and described in connection with FIG. 3) for a write request may be set to WC for use with, for example, a write combining buffer (e.g., as shown at 217 in FIG. 2) associated with the CPU 110.

When a read operation is requested, the SSD driver 118 can determine that a read request has been issued and can relay a command for performance of the read operation using an address for the RD-BAR 222-1. In situations where a write operation is requested, for example, via a user application and/or a system program, the SSD driver 118 can determine that a write request has been issued and can relay a command for performance of the write operation using an address for the WR-BAR 322-2.

Because data for a read operation type retrieved from, for example, non-volatile memory 126 of the SSD 104 may be cached in a cache associated with the CPU 110 (in the internal caches 112 and/or external cache(s) 114), a processing speed of the data may be improved. For example, the processing speed may approximate a speed of the data being provided to the processor from volatile memory (e.g., DRAM 116 disposed in the host computing device 110 and/or DRAM 126 disposed on the SSD 104). Similar improvement in processing speed may be achieved for a write operation type using a WC buffer 117 associated with the CPU 110.

Figure 2:
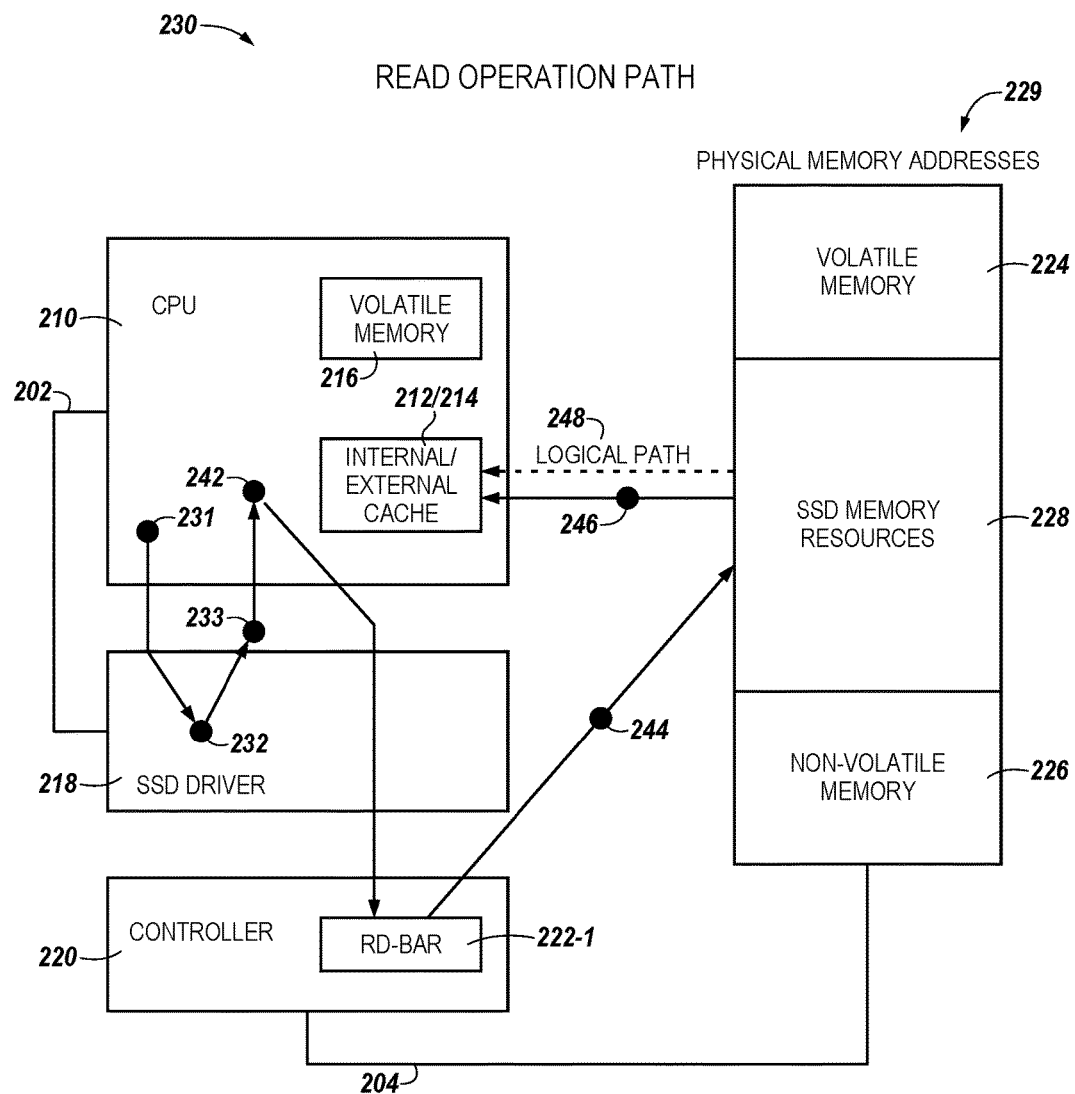
FIG. 2 is a diagram illustrating read operation path in accordance with a number of embodiments of the present disclosure.

FIG. 2 is a diagram illustrating read operation path in accordance with a number of embodiments of the present disclosure. The read operation path 230 illustrated in FIG. 2 may, in some embodiments, be implemented in an interface (e.g., PCIe) circuit, as indicated by reference number 108 in FIG. 1. Hence, implementation of the read operation path 230 may be performed, for example, using a host computing device 202 and at least one SSD 204, as described in connection with corresponding reference numbers in FIG. 1.

The CPU 210 can issue a request 231 for performance of a read operation type to the SSD driver 218. The SSD driver 218 is configured to determine 232 that the request 231 is for performance of the read operation type. Such a determination may be relayed 233 to the CPU 210 with instructions such that a RD-BAR 222-1 associated with the controller 220 of a particular SSD 204 is selected 242 for use by the CPU 210 in performance of the read operation type on data stored in the same secondary memory resources 228. In some embodiments, the RD-BAR 222-1 associated with the controller 220 may be selected by the device SSD driver 218.

The particular SSD 204 can include both a RD-BAR 222-1 and a WR-BAR (not shown in FIG. 2) associated with the controller 220. However, the SSD driver 218 assigns the requested read operation to the RD-BAR 222-1 that includes the mapped addresses set to, for example, WP cacheable as the assigned cache attribute. Using the mapped addresses 244 of the physical memory addresses 229 of the SSD memory resources 228, the data can be retrieved 246 in a logical path 248 from the same secondary physical memory resource. As used herein, a WP cache attribute is intended to mean a technique for caching data in association with a processor, such as CPU 210. The WP cache attribute may control the cache such that no write operations may be performed on the data, although read operations, or portions thereof, may be performed in any order on the cached data. themselves, or portions thereof, may be performed in any order on the cached data.

In various embodiments, the retrieved data may be sent to the host computing device 202 and at least temporarily stored in the one or more internal caches 212 (e.g., L1, L2, and/or L3 caches), the one or more caches 214 external to the CPU 210 (e.g., L4 caches), and/or the volatile memory 216 (e.g., DRAM) of the primary memory resource for use by the CPU 210 during performance of the read operation type. Hence, particular memory of the primary memory resource in the host computing device 202 can be selected for storage of data values transferred from the same secondary memory resource for use by the CPU 210. The primary memory resource (e.g., the internal caches 212 and/or the external cache(s) 214) may be controlled by an enabled cache attribute, for example WP.

Accordingly, as described herein in various embodiments, the SSD driver 218 may be configured to receive a request from the CPU 210 for performance of an operation and to determine whether the requested operation is, for example, a read operation type or a write operation type. The SSD driver 218 may be further configured to select a BAR from the plurality of BARs as appropriate for use with the determined operation type and to assign the operation to a particular BAR as determined by which one of the plurality of types of operations is requested. In various embodiments, the plurality of BARs each may be assigned a different cache attribute type, where the different cache attribute type of each BAR may correspond to the type of operation that is requested.

The SSD driver 218 may be further configured to enable a cache attribute for use by the selected BAR in the performance of the determined operation type. An enabled cache attribute may be assigned to a selected BAR and the enabled cache attribute may be different from a cache attribute assigned to a non-selected BAR. For example, as shown in and described in connection with FIG. 2, a first BAR (RD-BAR 222-1) may be selected for a read operation type and an enabled cache attribute may be WP. As shown in and described in connection with FIG. 3, a second BAR (WR-BAR 322-2) may be selected for a write operation type and the enabled cache attribute may be WC.

As such, the first operation may be selectably assigned, by the SSD driver 218, to the first BAR based upon the first operation being a read operation type and the second operation may be selectably assigned, by the SSD driver 218, to the second BAR based upon the second operation being a write operation type. The SSD driver 218 may enable a first cache attribute (e.g., WP) selected for a read operation type for use with the first BAR in the read operation and may enable a second cache attribute (e.g., WC) selected for a write operation type for use with the second BAR in the write operation. The first cache attribute for use with the first BAR and the second cache attribute for use with the second BAR may be different cache attribute types.

As just described, the plurality of BARs may be two BARs selectably coupled to the same secondary memory resource. However, in various embodiments, the plurality of BARs may be more than two BARs selectably coupled to a plurality of partitions in a partitioned same secondary memory resource. For example, the same secondary memory resource may be partitioned into multiple partitions (regions) for the data to be available for different functions, for security reasons, etc. In such a situation, two (or more) different BARs associated with the controller 220 may be selectably coupled to a first partition and at least one different BAR may be selectably coupled to at least one of the other partitions. When more than two BARs are utilized, more than two different cache attributes may be assigned in some embodiments. For example, in place of or in addition to WP and WC, cache attributes such as WB, WT, WA, UC, and/or UC– may be assigned to at least one BAR.

Figure 3:
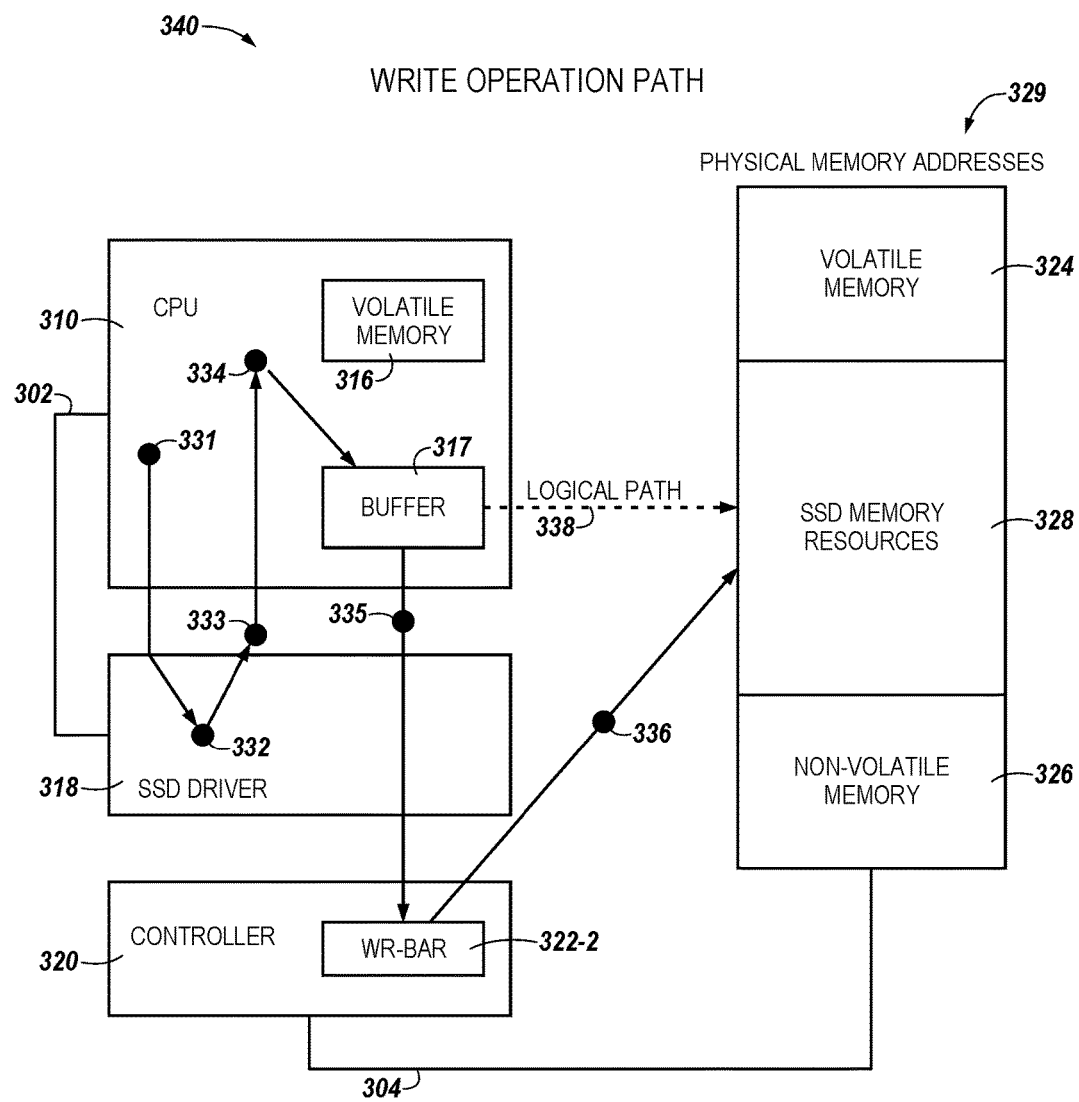
FIG. 3 is a diagram illustrating a write operation path in accordance with a number of embodiments of the present disclosure.

FIG. 3 is a diagram illustrating a write operation path in accordance with a number of embodiments of the present disclosure. The write operation path 340 illustrated in FIG. 3 may, in some embodiments, be implemented in an interface (e.g., PCIe) circuit, as indicated by reference number 108 in FIG. 1. Hence, implementation of the write operation path 340 may be performed, for example, using a host computing device 302 and at least one SSD 304, as described in connection with corresponding reference numbers in FIG. 1.

The CPU 310 can issue a request 331 for performance of, for example, a write operation type to the SSD driver 318. The SSD driver 318 is configured to determine 332 that the request 331 is for performance of the write operation type. Such a determination may be relayed 333 to the CPU 310 with instructions such that a buffer 317 in the host computing device 310 is selected 334 for accumulation and storage of data values to be transferred to the same secondary memory resources 328 for use by the CPU 310 in performance of the write operation type. The buffer 317 in the host computing device 302 can, in some embodiments, be selected by the device SSD driver 318 for use by the CPU 310 for transfer of the data.

The buffer 317 may be a WC buffer that is controlled by an enabled WC cache attribute. As used herein, a WC cache attribute is intended to mean a technique for allowing data to be accumulated and released in burst mode for transfer to the same physical memory resource instead of sending the data immediately to be written as such to the same physical memory resource. The data may be released from the buffer 317 when the amount (bits) of data reaches, for example, a threshold, such as the data capacity of the buffer 317, a page of data, a complete data file, among other threshold possibilities. The WC cache attribute may control the WC buffer such that read operations are ordered with respect to write operations.

Before, during, or after release of the data from the buffer 317, the SSD driver 318 can determine that the data be sent 335 to a particular secondary memory SSD 304 (e.g., a peripheral memory device in a PCIe circuit) for a write operation directed by its controller 320. The particular SSD 304 can include both a WR-BAR 322-1 and a RD-BAR (not shown in FIG. 3) associated with the controller 320. However, the SSD driver 318 assigns the requested write operation to the WR-BAR 322-1 that includes the mapped addresses set to WC as the assigned cache attribute. Using the mapped addresses 336 of the physical memory addresses 329 of the SSD memory resources 328 (e.g., the volatile memory 324 and/or non-volatile memory 326), the data can be written in a logical path 338 from the buffer 317 to the intended physical memory addresses 329 of the SSD memory resources 328.

The present disclosure may provide benefits compared to other peripheral component interconnect system approaches (e.g., PCI, PCIe, PCI-X, and AGP, among others) by decoupling a read operation from a write operation to the same SSD resources. Writing of data may not largely affect performance of a system because data may be written only when a buffer and/or cache, for example, has reached a threshold and sends the data to make more memory available in the buffer and/or cache. In addition, when write data arrives at the SSD memory resources 328, the data may first be disposed onto the SSD's internal volatile memory 324 (e.g., a DRAM and/or a static random access memory (SRAM)) write buffer so non-volatile memory 326 latency may be effectively hidden.

In contrast, reading data from SSD memory resources 228 may be more influential to system performance because CPU 210 activity may be delayed until the requested data is retrieved and delivered. In other peripheral component interconnect system approaches, read operation performance also may be delayed because a write operation may prevent read data from being cacheable due to sharing single BAR for the address space with write operations. As such, improving the speed and/or efficiency of read operations may boost performance of such a system. Hence, the present disclosure describes enabling read operations to be separately cacheable by providing at least two BARs for the same SSD physical memory resources, with separate BARs being used for the read and write operations.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a plurality of base address registers (BARs) each including same addresses for data storage in a same memory resource; wherein:
to enable performance of a write operation, the write operation is assigned to a first BAR that has a selected first cache attribute;
to enable performance of a read operation, the read operation is assigned to a second BAR that has a selected second cache attribute, and
the plurality of BARs is positioned on a same controller positioned in the same memory resource.

2. The apparatus of claim 1, wherein the plurality of BARs is selectably coupled to the same memory resource.

3. The apparatus of claim 1, wherein:
during performance of the write operation, data values of the write operation are assigned for storage to a particular buffer local to a processor before transfer to the same memory resource, wherein the particular buffer is controlled by the selected first cache attribute; and
during performance of the read operation, data values of the read operation are assigned for storage to a particular cache local to the processor after transfer from the same memory resource, wherein the particular cache is controlled by the selected second cache attribute.

4. The apparatus of claim 1, wherein the apparatus is configured to assign an operation to one of the plurality of BARs as determined by which one of a plurality of types of operations is requested.

5. The apparatus of claim 1, wherein:
the plurality of BARs each comprises a different cache attribute; and
the different cache attribute of each BAR corresponds to a type of operation that is requested.

6. The apparatus of claim 1, wherein the same memory resource is selected from at least one of:
a NAND flash memory as a non-volatile memory resource;
a 3D XPoint memory as a non-volatile memory resource; and
a dynamic random access memory (DRAM) as a volatile memory resource.

7. The apparatus of claim 1, further comprising:
a device driver selectably coupled to the same memory resource, wherein the device driver is configured to direct that:
a write operation type is assigned to a selected first BAR that has the selected first cache attribute that is enabled by the assignment to enable the performance of the write operation; and
a read operation type is assigned to a selected second BAR that has the selected second cache attribute that is enabled by the assignment to enable the performance of the read operation;
wherein the first cache attribute is different from the second cache attribute.

8. The apparatus of claim 6, wherein the device driver is further configured to:
receive a request for performance of an operation;
determine whether the requested operation is the read operation type or the write operation type; and
select a BAR from the plurality of BARs as appropriate for use with the determined operation type.

9. A method, comprising:
mapping of addresses for data storage in a secondary memory resource, the mapping set to a first cache attribute for a read operation request;
enabling performance of the requested read operation by assignment to a first base address register (BAR) that includes the mapped addresses set to the first cache attribute;
mapping of the addresses for data storage in a same secondary memory resource, the mapping set to a second cache attribute for a write operation request; and
enabling performance of the requested write operation by assignment to a second BAR that includes the mapped addresses set to the second cache attribute;
wherein:
the enabled first or second cache attribute is different from a cache attribute assigned to a non-selected BAR; and
the first BAR and the second BAR are positioned in a same controller positioned in the same secondary memory resource.

10. The method of claim 9, wherein the method further comprises:
assigning, by a device driver, the requested read operation to the first BAR that includes the mapped addresses set to Write Protected as the first cache attribute; and
assigning, by the device driver, the requested write operation to the second BAR that includes the mapped addresses set to Write Combining as the second cache attribute.

11. The method of claim 9, wherein the method further comprises:
enabling, by a device driver, Write Protected as the first cache attribute assigned for the requested read operation for use with the first BAR that includes the mapped addresses; and
enabling, by the device driver, Write Combining as the second cache attribute assigned for the requested write operation for use with the second BAR that includes the mapped addresses.

12. A system, comprising:
a host computing device comprising a central processing unit (CPU) and a primary memory resource;
a device driver selectably coupled to the CPU; and
a same secondary memory resource configured to include a plurality of base address registers (BARs) each including same addresses for data storage in the same secondary memory resource, wherein:
the plurality of BARs is positioned on a same controller positioned in the same secondary memory resource;
the device driver is configured to direct that:
to enable performance of a read operation, the read operation is assigned to a first BAR that has a selected first cache attribute;
to enable performance of a write operation, the write operation is assigned to a second BAR that has a selected second cache attribute; and
the selected first cache attribute of the first BAR and the selected second cache attribute of the second BAR are different cache attribute types.

13. The system of claim 12, wherein the apparatus further comprises a peripheral component interconnect express (PCIe) bus as a communication interface between the host computing device, the device driver, and a peripheral memory resource comprising the same secondary memory resource to form a PCIe circuit.

14. The system of claim 12, wherein:
the device driver is disposed on the host computing device and is selectably coupled to the plurality of BARs; and
the plurality of BARs is selectably coupled to the same secondary memory resource.

15. The system of claim 12, wherein:
a particular cache in the host computing device is assigned by the device driver for storage of data values transferred from the same secondary memory resource; and
the particular cache is controlled by an enabled first cache attribute.

16. The system of claim 15, wherein the enabled first cache attribute is Write Protected for the read operation.

17. The system of claim 12, wherein:
a particular cache in the host computing device is selected by the device driver for use by the CPU in performance of the read operation; and
the particular cache is an internal cache that is part of the CPU.

18. The system of claim 12, wherein:
a particular cache in the host computing device is selected by the device driver for use by the CPU in performance of the read operation; and
the particular cache is a cache that is external to the CPU.

19. The system of claim 12, wherein:
a particular buffer in the host computing device is assigned by the device driver for storage of data values to be transferred to the same secondary memory resource in performance of the write operation; and
the particular buffer is controlled by an enabled Write Combining as the second cache attribute.

20. The system of claim 12, wherein:
a particular buffer in the host computing device is selected by the device driver for use by the CPU for transfer of data in performance of the write operation; and
a particular cache in the host computing device that is different from the particular buffer is selected by the device driver for use by the CPU in performance of the read operation.

* * * * *